A. T. BALDWIN, DEC'D.
C. P. BALDWIN, EXECUTRIX.
DIFFERENTIAL GAGE.
APPLICATION FILED SEPT. 24, 1917.

1,394,661.

Patented Oct. 25, 1921.
2 SHEETS—SHEET 2.

ON LINE. 2-2. FIG. 1.

INVENTOR
Abram T. Baldwin.
BY
ATTORNEYS

UNITED STATES PATENT OFFICE.

ABRAM T. BALDWIN, OF DETROIT, MICHIGAN; CATHERINE P. BALDWIN EXECUTRIX OF SAID ABRAM T. BALDWIN, DECEASED.

DIFFERENTIAL-GAGE.

1,394,661.  Specification of Letters Patent.  Patented Oct. 25, 1921.

Application filed September 24, 1917. Serial No. 193,047.

*To all whom it may concern:*

Be it known that I, ABRAM T. BALDWIN, a citizen of the United States, residing at Detroit, county of Wayne, State of Michigan, have invented a new and useful Differential-Gage, of which the following is a specification.

My invention consists of a novel construction of a differential gage wherein I am enabled to indicate or ascertain the differences of the pressures of a gas, fluid or liquid under pressure, conveyed in separate conduits to a liquid seal or, in other words, the differential of the static heads which is required to be measured in a novel and accurate manner, by means of an annular tube having partitions therein forming chambers, into the upper portions of which chambers pressure is conveyed by means of pressure conduits having their upper ends secured to said tube and their lower ends secured to the top of a pair of upper inverted cup members whose lower ends are immersed in said liquid seal, said upper cup members, pressure conduits and annular tube moving together as a unit.

It further consists of other novel features of construction, all as will be hereinafter fully set forth.

For the purpose of illustrating my invention I have shown in the accompanying drawing a form thereof which is at present preferred by me, since the same will be found in practice to give satisfactory and reliable results, although it will be understood that the various instrumentalities of which my invention consists can be variously arranged and organized and that my invention is not limited to the precise arrangement and organization of these instrumentalities as herein shown and described.

Fig. 3 represents, on a reduced scale, a section on line 3—3 Fig. 2.

Similar numerals of reference indicate corresponding parts in the figures.

Figure 1:
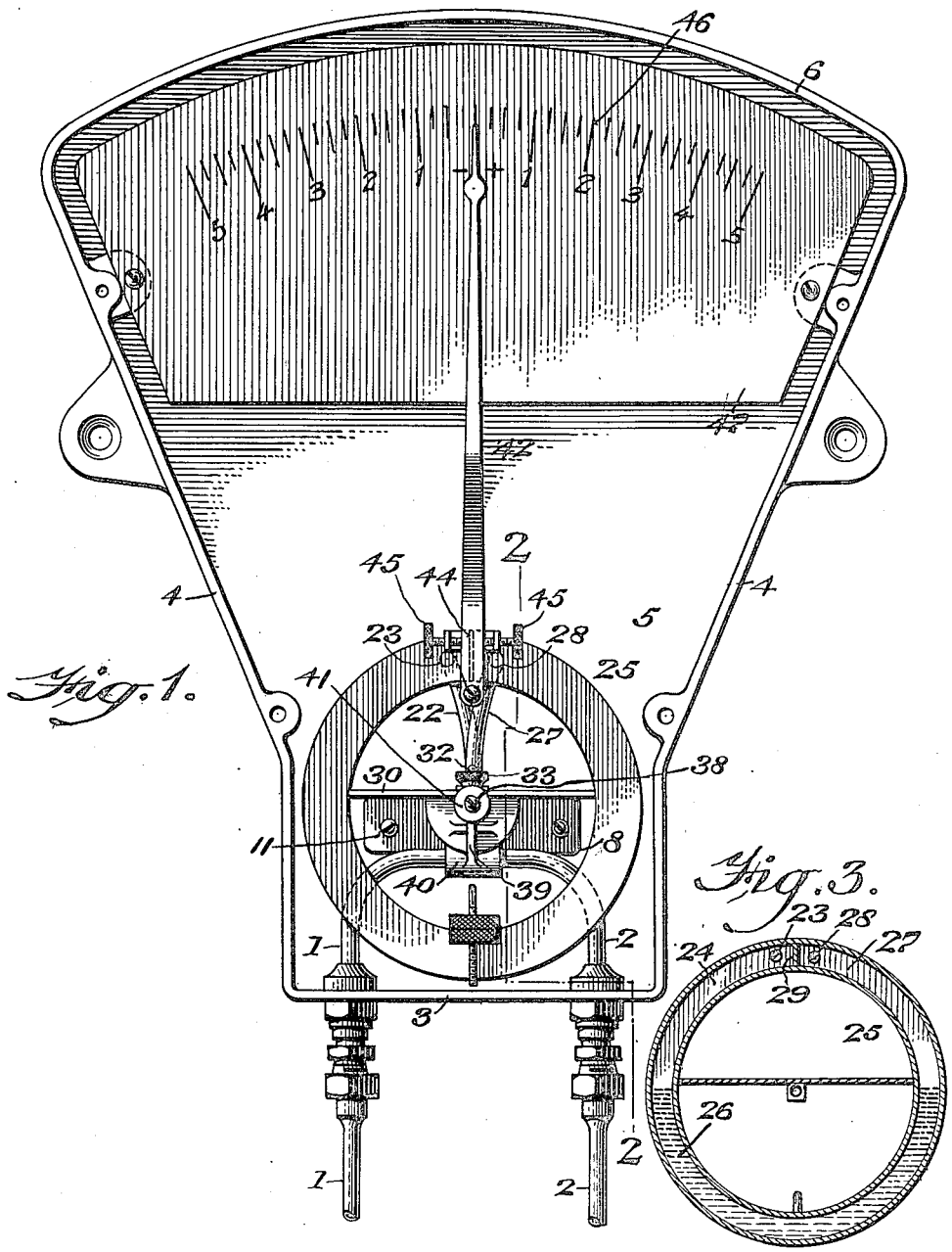
Figure 1 represents a front elevation of a differential gage, embodying my invention.

Referring to the drawings,

The pressure of the static heads whose differential it is required to measure is conveyed from the desired points initially to the pipes or conduits 1 and 2. The pipe 2 passes upwardly through the base 3 of the gage casing which has the sides 4, back 5 and top 6 and discharges the pressure into the chamber 7 of the receptacle or casting 8, which has the bottom 9, the rear wall 10 and the front wall 11.

Figure 2:
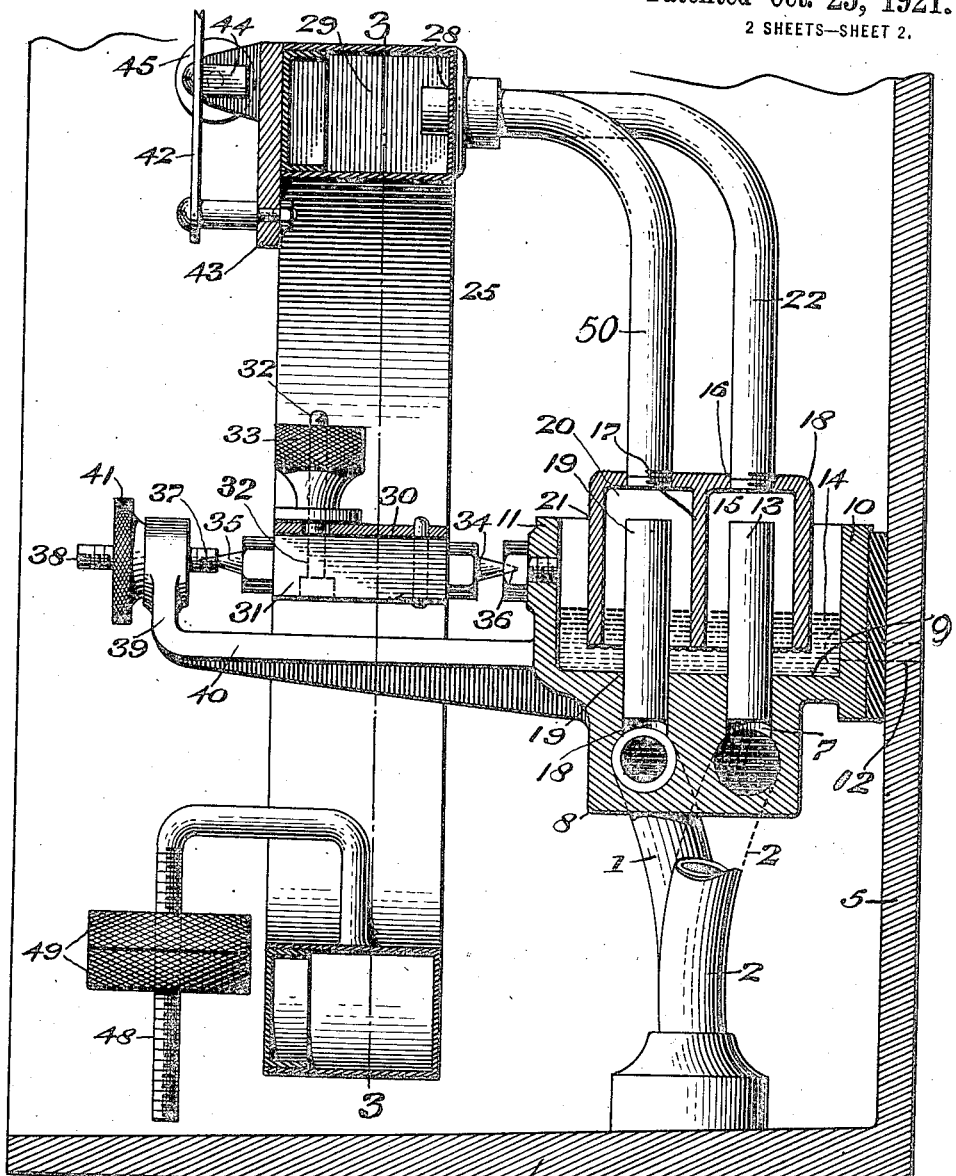
Fig. 2 represents, on an enlarged scale, a sectional view, partly in elevation, the section being taken on line 2—2 Fig. 1.

The receptacle 8 is secured to the gage wall 5 in a stationary position by any suitable fastening device 12, seen dotted in Fig. 2. 13 designates a short conduit leading from the chamber 7 through the liquid seal 14 into the chamber 15, formed within the inverted cup composed of the top 16, and the depending walls 17 and 18. The pipe or pressure conduit 1 after passing through the base 3 conveys the pressure therein to the chamber 18 from which extends the pipe 19 through the liquid seal 14 into the chamber 20 of the inverted cup formed by the top 16 and the depending walls 17 and 21. The liquid indicated at 14 may be mercury or other suitable liquid and is contained in the stationary receptacle 8 and this in conjunction with the inverted movable cup member having the chambers 15 and 20, forms a liquid seal, it being apparent that the differential pressures in the pipes 1 and 2 are conveyed to the chambers 20 and 15, so that said pressures can be conducted from said chambers, as will next be explained, without the mercury or other liquid, which forms said seal passing therefrom.

The pressure is conducted from the chamber 15 through the pipe or pressure conduit 22 and discharges at 23 into the upper portion of the chamber 24 of the annular closed tube or pivoted oscillatory member 25, which contains the oil or other liquid 26. From the chamber 20 the pressure is conducted through the pipe or pressure conduit 50 to the upper portion of the chamber 27 at the point 28 within said member 25, said chambers 24 and 27 being continuous at their lower portions but separated at their upper portions by the partition 29. 30 designates a diametrically extending bar or plate within the annular member 25, beneath which is located the pivot block 31, the latter being secured thereto by the bolt 32, having the nut 33 thereon. 34 designates the rear pivot and 35 the front pivot carried by said pivot block 31, said rear pivot engaging the seat 36, carried by the front wall 11, while said front pivot engages the seat 37 of the threaded stem 38, which is carried by the arm 39 of the bracket 40, which is attached to or supported by the receptacle 8, said stem 38 carrying the lock nut 41. 42 designates a pointer having its lower end attached to the plate 43 which is secured to the upper portion of the annular oscillatory member 25, said pointer having the member 44 at the rear thereof, against which the adjusting screws 45 bear, the upper end of said pointer coacting with the scale 46 on the dial 47.

48 designates a threaded vertical stem secured to the lower portion of the annular member 25 and carrying the weights 49, which are employed for calibrating to a given scale. The less radial distance of weights 49 to axis of motion the less is the force necessary to move the annular member a given unit or distance.

The operation is as follows:—

The annular member 25 being pivotally supported, it will be apparent from Fig. 2 that it and the pressure conduits 22 and 50 together with the inverted caps of the liquid seal will operate or oscillate in unison as a unit. The static heads, whose differential is required to be measured, are brought up in the pipes 1 and 2, to the chambers 20 and 15 above the liquid seal and transmitted to the chambers 24 and 27 to the surface of the liquid 26, see Fig. 3. The differential corresponding to the difference of pressure acting on the two opposite faces of the partition 29, thus throws the oscillatory annular member 25 out of equilibrium and the readings can be readily ascertained from the pointer and scale 46.

In my present construction the number of parts is reduced to a minimum and this invention is differentiated from that of my contemporaneously pending application Serial No. 193,046, wherein the top of the cups of the liquid seal does not move in unison with the annular oscillatory tube member, it being apparent that herein the upper cups of the liquid seal move in unison with the pipes 22, 50 and the annular tube 25.

It will now be apparent that I have devised a novel and useful construction of a differential gage, which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, an annular closed tube adapted to contain a liquid and having a partition in the upper portion thereof, pivotal supports for said annular tube, a liquid seal having a movable top member, and pipes leading from said top member to said annular tube at either side of said partition, said top member, pipes and annular member being movable as a unit.

2. In a device of the character stated, an annular closed tube adapted to contain a liquid and having a partition in the upper portion thereof, front and rear pivotal supports for said tube, a pointer carried on the upper portion of said tube, a liquid seal having a two chambered movable top member, and pipes leading from said top member to said tube on each side of said partition, said top member, pipes and annular tube being movable as a unit.

3. In a device of the character stated, an annular closed tube pivotally supported, a liquid seal composed of a stationary bottom member adapted to contain a liquid and having chambers in the base thereof, means for conveying pressure into said chambers, short pipes leading upwardly from said chambers, a two chambered inverted cup member supported in said liquid and extending above the latter, and pipes leading from said cup member to the top of said annular tube, said tube, pipes and cup member being movable in unison.

4. In a device of the character stated, an annular closed tube having a partition in the upper portion thereof, a liquid seal receptacle, front and rear pivot points carried by said tube, a liquid seal carried in the bottom of said receptacle, a bracket carried by said receptacle, a threaded stem carried by the front end of said bracket and having a pivot seat therein for said front pivot point, a nut engaging said stem, and means for conveying pressure from said liquid seal to said annular tube at either side of said partition.

5. In a device of the character stated, an annular tube having its ends united and adapted to contain a liquid, said tube being pivotally supported, a partition within said tube, a pointer fixedly carried by said tube to move in unison with it, a scale with which said pointer coöperates, and means to conduct differential pressures into said tube on opposite sides of said partition.

6. In a device of the character stated, an annular closed tube adapted to contain a liquid and provided with a partition and pivotally supported, a pointer carried by said tube, a scale, and means including a liquid seal to conduct differential pressures into said tube on opposite sides of said partition.

7. In a device of the character stated, an annular tube pivotally supported and adapted to contain a liquid, a partition in the upper portion of said tube, a two-chambered liquid seal, and conduits for conveying pressure from each chamber of said seal to each side of said partition.

8. In a device of the character stated, an annular tube pivotally supported, and adapted to contain a liquid, a partition in the upper portion of said tube, a two-chambered liquid seal, means for conveying the pressure of static heads to said seal, and conduits for conveying pressure from each chamber of said seal to each side of said partition.

9. In a device of the character stated, an annular tube pivotally supported, and adapted to contain a liquid, a partition in the upper portion of said tube, a two-chambered liquid seal, and conduits for conveying pressure from each chamber of said seal to each side of said partition, in combination with indicating devices coacting with said annular tube.

10. In a device of the character stated, the combination of an oscillating annular endless member, a partition in the upper portion thereof, means for creating a difference of pressure on opposite faces of said partition, a dial above said member, and a pointer fixed to said tube and extending from said member toward said dial.

11. In a device of the character stated, the combination of an oscillating annular endless member, a partition in the upper portion thereof, means for creating a difference of pressure on opposite faces of said partition, a dial above said member, and a pointer fixed to and extending from said member toward said dial, in combination with means for adjusting said pointer.

12. In a device of the character stated, the combination of an oscillatory annular hollow endless member adapted to contain a liquid, a partition fixed in the upper portion thereof, a pointer having one end fixed to said member and means for creating a difference of pressure within said member on opposite faces of said partition.

13. In a device of the character stated, an annular oscillatory hollow endless member, a pointer fixedly secured thereto, a partition fixed in the upper portion of said member, and pressure conveying conduits leading to each side of said partition, said annular member, pointer and conduits moving as a unit.

ABRAM T. BALDWIN.

Witnesses:
S. L. CHRISTENSEN,
W. T. GORTON.